INVENTOR:—
William B. Plummer
BY Donald E. Payne
ATTORNEY

Nov. 30, 1943. W. B. PLUMMER 2,335,610
DEHYDRO-AROMATIZATION SYSTEM
Filed Sept. 13, 1939 2 Sheets-Sheet 2

INVENTOR:—
William B. Plummer
BY Donald E. Payne
ATTORNEY

Patented Nov. 30, 1943

2,335,610

UNITED STATES PATENT OFFICE 2,335,610

DEHYDRO-AROMATIZATION SYSTEM

William B. Plummer, Chicago, Ill., assignor to Standard Oil Company, Chicago, Ill., a corporation of Indiana Application September 13, 1939, Serial No. 294,773

15 Claims. (Cl. 196—52)

This invention relates to the conversion of ordinary naphthas to high octane number motor fuel by a process of catalytic reforming in which there is appreciable dehydrogenation and aromatization.

It has recently been discovered that under certain operating conditions, dehydrogenation catalysts such as chromium oxide gel, chromium oxide on alumina, molybdenum oxide on alumina, etc., have the remarkable and unexpected property of causing ring closure, i. e. the conversion of straight chain hydrocarbons to aromatics. This discovery is not directly applicable for practical industrial use because of the short catalyst life. An object of my invention is to provide a method and means for extending such catalyst life so that this aromatization process will have practical utility.

An object of the invention is to convert low knock rating naphthas to high knock rating motor fuels and more particularly to obtain octane numbers of 85 to 90 or higher, i. e. higher octane numbers than can possibly be obtained by presently known cracking processes.

It is a further object to produce different grades of hydrogen in a catalytic reforming process and to utilize each grade of hydrogen in the process at that point where it is most effective. A further object is to minimize the amount of hydrogen purification or concentration that is required in the catalytic reforming system. A further object is to provide new and improved methods and means for utilizing hydrogen produced in one part of the system (or at one stage of the operation) in other parts of the system (or in other stages of the operation).

A still further object is to avoid the necessity of employing extraneous hydrogen in a catalytic reforming system, to minimize the necessary storage facilities, to minimize the construction and operating costs and to improve the overall efficiency of the catalytic reforming process.

After extended research and development work with a view toward putting the catalytic reforming process on a practical commercial basis it has been found that the dehydro-aromatization reaction can be very greatly prolonged. In the absence of hydrogen the catalyst loses its activity in a relatively short time, which may range from a few minutes to a few hours. By effecting the operation in the presence of hydrogen under moderate pressure of about 30 to 450 pounds per square inch I have found that the catalyst retains its activity up to 15 or 20 hours or more. Furthermore, the presence of hydrogen appears to exert a beneficial influence in preventing the degradation of the charging stock and in promoting and prolonging the efficiency of the catalyst.

Using fresh catalyst at a temperature of 875 to 950° F. and a naphtha feed of about 0.2 to 2 volumes per volume of catalyst space per hour, a substantial amount of dehydro-aromatization may be effected either in the presence or absence of added hydrogen, and under these conditions relatively pure hydrogen is produced, i. e. hydrogen which contains a minimum amount of methane, ethane, etc. As the reaction proceeds the catalyst becomes partially spent relatively quickly unless it is protected and promoted by the presence of gaseous hydrogen under pressure, and at the same time the produced hydrogen is contaminated by more and more hydrocarbon gases, particularly if the temperature is increased. If hydrogen were simply recycled as it is done in conventional hydrogenation practice, gaseous hydrocarbons would build up in the system and the effectiveness of the hydrogen in the later stages of operation would be appreciably reduced. In accordance with the present invention the mol ratio and/or purity of the hydrogen recycled is gradually increased as the catalyst becomes more and more spent, so that the quality of the reformed naphtha is not impaired and so that the effective catalyst life may be increased to many times what it would otherwise be in the absence of this increase of hydrogen concentration and/or purity.

In certain stages of the process or in certain parts of the system relatively pure hydrogen is produced. For instance, during the initial stages of operation on fresh catalyst the hydrogen purity is very high. Relatively low temperatures tend to produce gases of high hydrogen concentration. The production of relatively low knock rating gasoline (i. e. 70 to 75 octane number) gives much purer hydrogen than can be obtained from the production of high knock rating motor fuels (upwards of 90 octane number). In accordance with this invention the relatively pure hydrogen from these various sources is segregated in a "pure hydrogen" storage tank, from which it may be withdrawn to those parts of the system where pure hydrogen is needed.

In the later stages of the operation where a partially spent catalyst, high temperatures, etc., prevail, there is an increased tendency for the production of hydrocarbon gases and the hydrogen content may only be about 50 to 70%. In accordance with this invention hydrogen thus produced is segregated and stored in a separate storage tank from the pure hydrogen and is used in those parts of the system where pure hydrogen is not necessary. If desired the hydrogen may be segregated into three separate storage tanks—pure, intermediate grade and low grade hydrogen. The intermediate or low grade hydrogen fractions are particularly useful for the conditioning of the catalyst after regeneration.

An important feature of the invention is the production in the process itself of all hydrogen required for carrying out the process and the venting from the system of only that net hydrogen which is of too low grade to be of practical utility in the system. For the production of hydrogen, pressures must be below 450 pounds per square inch and preferably not higher than 200 to 250 pounds per square inch.

When operating a single converter the relatively pure hydrogen produced in the initial stage is saved and utilized to protect and increase catalyst activity in the later stages of the run. When using a plurality of converters the pure hydrogen produced on one may protect and promote the partially spent catalyst in the other, and vice versa. When two converters are producing different qualities of motor fuels, the relatively pure hydrogen from one converter may protect and promote the catalyst activity in the other converter.

The invention will be more clearly understood from the following detailed description, and from the accompanying drawings which form a part of this specification and wherein similar parts are designated by like reference characters in the several figures.

Figure 3:
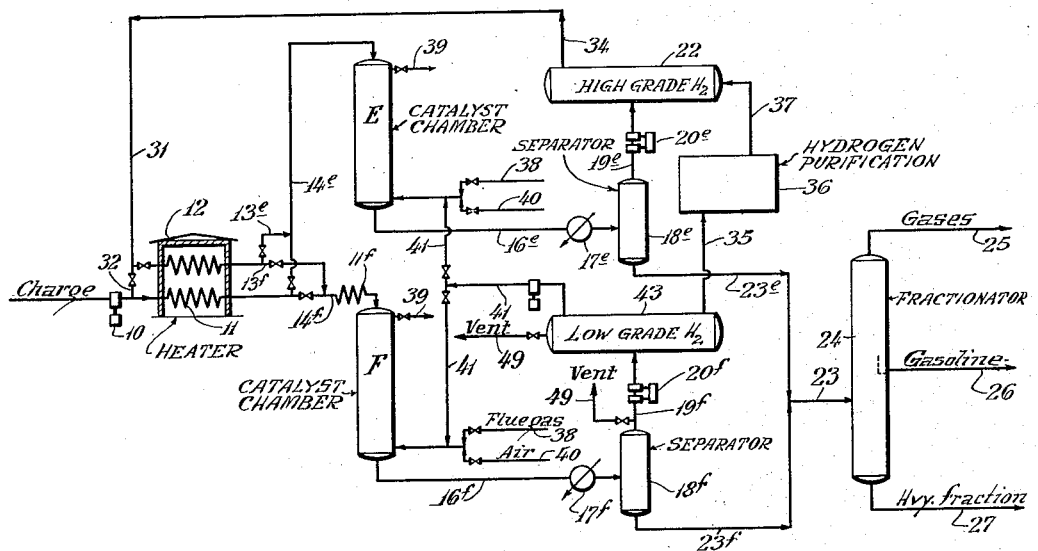
Figure 4:
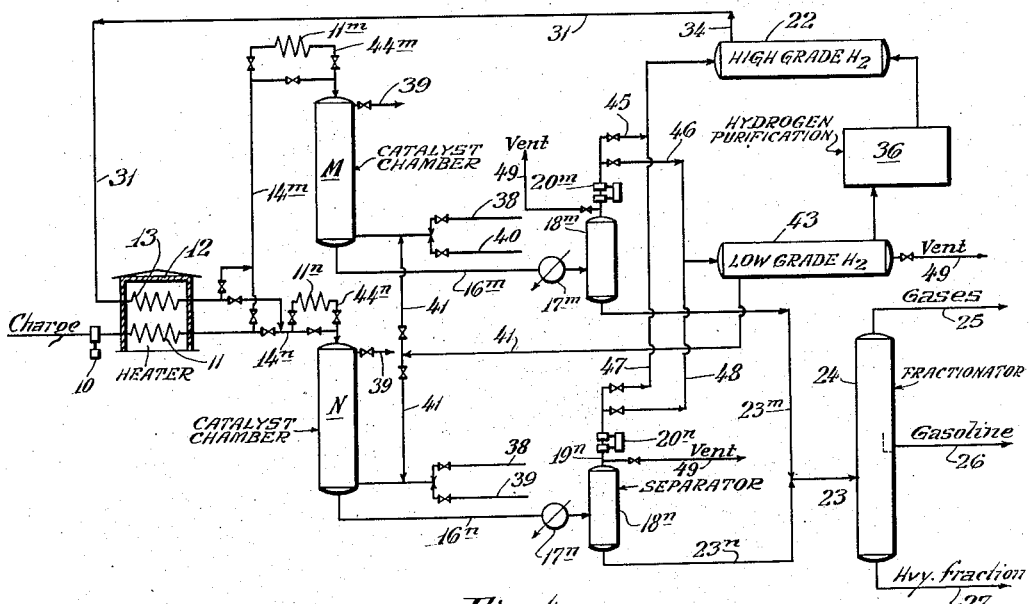

Figure 3 is a flow diagram of a multiple fixed bed conversion system wherein high quality motor fuel is produced in one converter and a lower quality motor fuel in the other, the hydrogen produced in each stage being separately collected and utilized under optimum conditions in the other converter; and Figure 4 is a multiple fixed bed conversion system wherein one converter is operating on relatively fresh catalyst and the other on partially spent catalyst, the hydrogen produced by each converter being segregated and utilized in the other converter.

The invention is not limited to any particular naphtha, nor to a naphtha of any particular boiling range. The naphtha may be either straight run or cracked or it may be produced by the hydrogenation of carbonaceous materials, by the catalytic conversion of carbon monoxide and hydrogen or by any other known method. The boiling range may be about 200 to 450° F. and the process is most desirable for the upper range, i. e. fractions boiling from about 300 to 450° F. Closely cut fractions may be separately treated under optimum conditions. Generally speaking, the charging stocks for the process are rich in aliphatic hydrocarbons consisting chiefly of straight and branched chain hydrocarbons having from 6 to 12 or 14 carbon atoms. Preferably charging stock is a straight run or cracked naphtha and most effective results are obtained by utilizing a stock which initially has an octane number lower than 50. Naphthenes in the charging stock are desirable but not essential.

Various catalysts can be employed in the reforming or conversion step, preferably an oxide of a sixth group metal mounted on active alumina or alumina gel (a form of alumina obtained as a scale in aluminum ore purification). About 2 to 10% of molybdenum oxide on alumina or about 8 to 40% of chromium oxide on alumina have been found to give excellent results. It should be understood, however, that the present invention is not limited to any particular catalyst but is applicable to the use of any dehydro-aromatization catalyst known to the art. The minor ingredient of the catalyst is preferably an oxide of molybdenum, chromium, tungsten or uranium or any mixture thereof mounted on bauxite, precipitated alumina, activated alumina or any other suitable catalyst support. Magnesium, aluminum or zinc chromites, molybdenites, etc., may be employed since it has been found that the sixth group metal is particularly active when it is in the anion. Vanadium and cerium oxides have been found to be effective for the conversion. Oxides of copper, nickel, manganese, etc., may be included to facilitate regeneration or for supplementing catalyst activity, but they are not known as aromatization catalysts.

The catalysts may be made by impregnating activated alumina or other support with molybdic acid, ammonium molybdate or any other catalyst compound decomposable by heat. Also, the aluminum and molybdic oxides may be coprecipitated as a gel or the separate oxides may be mixed together as a paste, dried, extruded under pressure or pelleted and heated to a temperature of about 900 to 1200° F. Since the preparation of the catalyst forms no part of the present invention it will not be described in further detail.

The catalyst may be employed in fixed beds, in movable beds or as a powder suspended in a gaseous stream, the conversion in all cases being in the vapor phase. The fixed bed catalyst may be positioned in tubes mounted, for instance, in the convection section of a furnace or they may be positioned in a single bed or plurality of beds in vertical towers or chambers. The moving catalyst may be charged to the top of a tower or tube either continuously or intermittently, the spent catalyst being withdrawn from the base of the tube at substantially the same rate; in this case the reaction takes place continuously and under substantially constant conditions of temperature and pressure, the regeneration being effected outside of the conversion zone. The powdered catalyst may be fed into a rapidly moving stream of vaporized naphtha and hydrogen, separated therefrom after the reaction is completed and separately regenerated by oxygen while suspended in flue gas. In the case of powdered catalyst, the expression "space velocity" is not applicable—the equivalent effect is obtained by using about 1 to 5 volumes of catalyst per volume of oil and using a contact time of about 5 to 200 seconds. Any of these specific catalyst reactors or their equivalents may be used in practicing the invention, but they will not be described in further detail.

Figure 1:
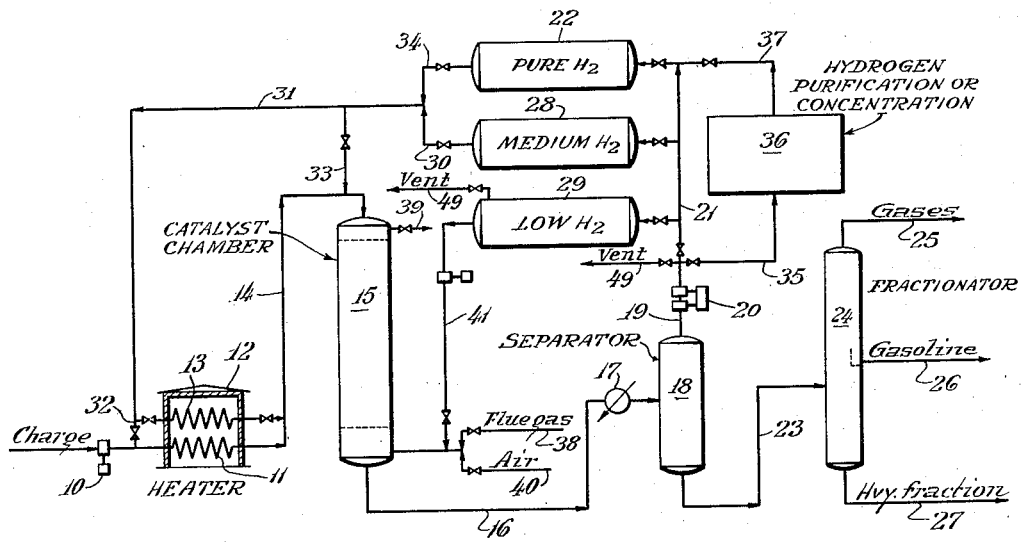
Figure 1 is a flow diagram illustrating a simple fixed bed catalyst system wherein hydrogen is segregated and utilized in various stages or parts of the run.

Referring specifically to Figure 1, a straight run naphtha having a boiling range of about 250 to 450° F. is charged by pump 10 to coils 11 of pipe still 12 under a pressure of about 30 to 450 pounds per square inch, preferably about 200 to 250 pounds per square inch and heated therein to obtain in the catalyst chamber an average bed temperature of about 875 to 1075° F., preferably about 900° F., initially, with a gradual rise in temperature as the reaction proceeds. Hydrogen is heated in separate coil 13, preferably to a higher temperature than the naphtha charge and admixed with the hot naphtha vapors in transfer line 14 which introduces this mixture into catalyst chamber 15. The space velocity through the catalyst chamber is preferably about 0.04 to 2 or more volumes of liquid naphtha feed per volume of catalyst space per hour. When starting up at high temperature space velocities of 5 or 10 or more may be used. The hot reaction products from the chamber are withdrawn through line 16 and cooler 17 to gas separator 18 which is preferably operated at substantially reaction pressure and at a temperature of about 35 to 105° F.

When the system is first started up it may not be necessary to introduce hydrogen through line 13. In the first stages of the reaction, while the catalyst is fresh and the reaction conditions are relatively mild, a very pure hydrogen will be produced and will separate from the liquids in separator 18. This hydrogen is withdrawn through line 19 and forced by compressor 20 through branched line 21 into pure hydrogen storage tank 22.

The liquids from the base of separator 18 are withdrawn through line 23 to fractionating column 24 from which gases may be taken overhead through line 25, gasoline may be withdrawn as a side stream through line 26 and fractions heavier than gasoline may be withdrawn through line 27. It should be understood, of course, that suitable reboiler means and reflux means are provided in the fractionating column and that instead of a single column any number of columns, stabilizers, etc., may be used. The gases may be polymerized either with or without a subsequent dehydrogenation or they may be used for alkylation, gas reversion or any other known purpose. Products heavier than gasoline may be recycled or thermally or catalytically cracked. None of these features need be described in detail in connection with the present invention.

After the catalyst has been on stream for a period which may range from about 1 to 5 or 10 hours and the catalyst has become partially spent, it is necessary to increase the severity of reaction conditions if the same degree of conversion is to be obtained, and this causes the production of methane and ethane, in other words the purity of the hydrogen is materially decreased. The severity of reaction may be increased by increasing the reaction temperature or by decreasing space velocity, or both. For instance, an increase in severity equivalent to raising a temperature from 950° to 1000° F. may be approximated by reducing the space velocity by about 50%.

When the hydrogen purity falls below the desired value, which for example may be about 85 to 90%, it is no longer introduced into the pure $H_2$ storage tank 22 but is charged to medium grade hydrogen storage tank 28. Toward the end of the conversion, when the catalyst is nearly spent, there will be more and more hydrocarbons contaminating the hydrogen and when the hydrogen content falls below, for example, 50 or 60% it is introduced into low grade hydrogen storage tank 29.

In order to promote and protect the catalyst during the later stages of the reaction, and in order to extend the catalyst life, it is necessary to increase the effective hydrogen purity or concentration or maintaining hydrogen purity as the reaction proceeds. If hydrogen were merely recycled the contaminants would build up during the latter stages of the process and there would be a lack of pure hydrogen in the system at the stage where it is most needed. These difficulties are avoided in the present invention by segregating the hydrogen in the manner hereinabove described and increasing the amount or purity of the hydrogen charged to the system as the reaction proceeds. Thus in the first stages hydrogen may be omitted entirely from the materials charged to the conversion chamber and relatively pure hydrogen may be produced. During the next stages of the operation an intermediate grade of hydrogen through lines 30, 31 and 13 (or 32 or 33) may be sufficient to maintain the catalyst activity while an intermediate grade of hydrogen is produced. During the final stages the pure hydrogen from tank 22, admixed with medium hydrogen if desired, is introduced through lines 34, 31 and 13 (or 32 or 33) with the charging stock and a medium low grade hydrogen is produced.

If there is not a sufficient amount of the pure hydrogen for the later stages of the reaction the intermediate or low grade hydrogen may be passed by line 35 to a hydrogen purification system 36 and thence by line 37 to storage tank 22. The purification system may be a scrubber employing liquefied hydrocarbons ranging from propane to gas oil as an absorber or scrubbing medium. The hydrocarbons may be selectively absorbed from the hydrogen by means of solids such as activated charcoal. The purification may be effected by a fractionation system of the Linde (1,773,012) or Claude (1,576,348) types. The impure hydrogen gases may be cracked for the production of further amounts of hydrogen simultaneous with the elimination of hydrocarbon gases. No invention is claimed in any particular purification or concentration system but an important feature of the invention is the fact that this purification need only be applied to one particular fraction of the produced gases.

The intermediate or low grade hydrogen is preferably employed to condition the catalyst after regeneration, which may be effected in the conventional manner. Flue gas may be introduced through line 38 for purging the catalyst system, the gases being discharged therefrom through line 39. Then small amounts of oxygen or air may be introduced through line 40 to burn off the carbonaceous deposits from the catalyst. This oxidation necessarily converts the catalyst into higher oxides. Before the catalyst goes on stream again it is desirable to reconvert it to the lower oxide form. Consequently after the oxidation is completed the circulation of flue gas and air is stopped and low grade hydrogen from tank 29 is introduced by line 41 to purge the system of oxygen gas and to reduce the catalyst once more to the lower oxide form.

The use of low grade hydrogen for this purpose offers several important advantages: It effects a marked saving on high grade hydrogen and prevents the initial degradation of charging stock which would result if this conditioning step were omitted. The hydrocarbons which are present in this low grade hydrogen apparently have no detrimental effect on the catalyst. It will be noted that when the hydrogen from line 41 is introduced into the freshly regenerated catalyst chamber there is an immediate temperature surge, the peak of which may reach, but should not exceed 1200° to 1400° F. It seems that this instantaneous reaction of the low grade hydrogen gases with the catalyst is a most effective method for reconditioning the catalyst for further use, thus decreasing carbon deposition on the catalyst and preventing degradation of the charging stock and loss of yields.

As above indicated, the reaction may begin at about 875 to 900° F. and the temperature may be gradually increased until toward the end of the reaction it is as high as 1000 to 1075° F. The same effect may be obtained by gradually reducing the space velocity at a substantially constant temperature within the range of 875 to 1075° F. The total onstream time may exceed 40 or 50 hours by virtue of the segregation of hydrogen and the use of relatively pure hydrogen in the later stages. By adjusting the valves in lines 30 and 34 the purity of the hydrogen in line 31 may be maintained or gradually increased with increasing times onstream and/or with rises of temperature. The mol ratio of hydrogen to naphtha charging stock may range from zero at low temperature starting conditions to about 8 to 1 at high temperatures with partially spent catalyst. With the exception of the starting period, the mol ratio of $H_2$ to oil should exceed 0.4.

It is important that the purity of the hydrogen be increased toward the end of the run, not only because the catalyst requires it for continued activity, but because it is undesirable to unduly increase the velocity or pressure of total gases through the reaction chamber. The use of fairly large mol ratios of relatively pure hydrogen during the high temperature stage is important also in order to produce, over long periods of time, high octane motor fuels, i. e., fuels of about 80 to 90 or higher octane numbers.

Although Figure 1 shows only a single catalyst chamber, it should be understood that a plurality of such chambers are used in practice so that some of the chambers may be onstream while others are undergoing regeneration.

Figure 2:
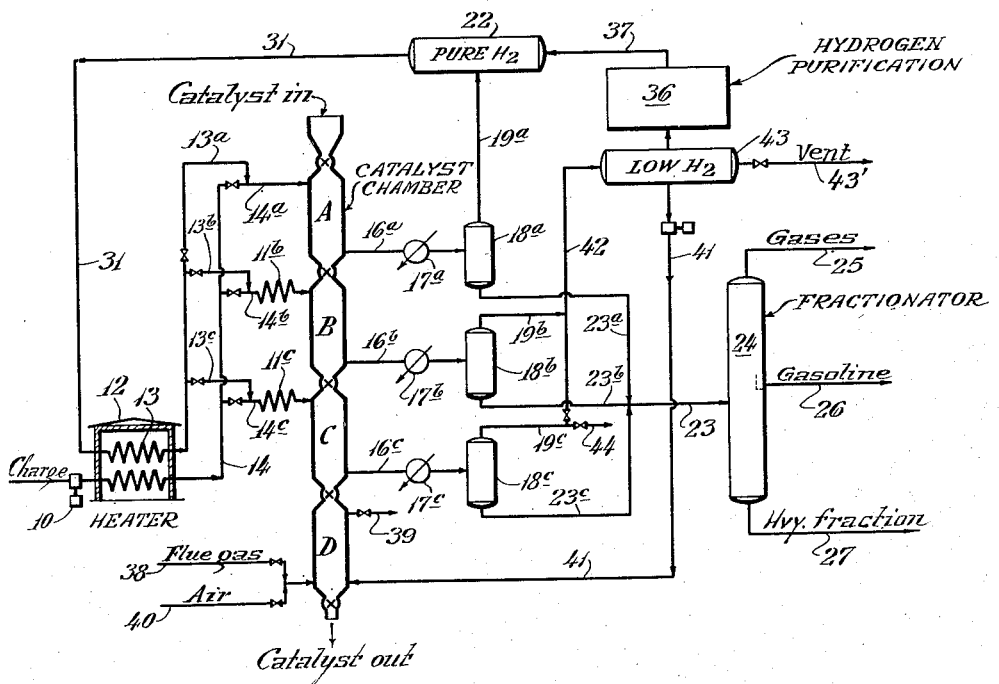
Figure 2 is a flow diagram of a multi-stage moving bed conversion system wherein the hydrogen produced in certain stages are effectively utilized in other stages.

Instead of the fixed bed type of catalysts, moving beds may be used, as shown in Figure 2. Here I employ a series of continuous or moving bed catalyst zones A, B, C and D. Fresh catalyst is introduced through gas-tight valve means into chamber A either continuously or intermittently and the catalyst from this chamber next passes through chambers B and C, thence to regeneration chamber D. The heated oil charge is split into streams 14a, 14b and 14c and additional heaters 11b and 11c (which may be mounted in furnace 12) provide for gradually increasing temperatures as the catalyst becomes more and more spent. Similarly, the hydrogen may be split into streams 13a, 13b and 13c, and line 13a may be omitted or closed. Concurrent flow through the catalyst chambers is shown, although countercurrent flow may be employed. In this system it is not essential that the valves between chambers A, B and C be tightly closed since a little leakage at these points is immaterial.

Chamber A may be operated at a temperature of about 875 to 900° F. or higher and the products therefrom passed by line 16a through cooler 17a to separator 18a, the relatively pure hydrogen being passed by line 19a to pure hydrogen storage tank 22. Chamber B may be at a temperature of about 950° F. and the products therefrom passed through line 16b and cooler 17b to separator 18b from which the hydrogen may be passed by line 19b and line 42 to low-grade hydrogen tank 43 or tank 22.

Chamber C may operate at a temperature of about 1000 to 1075° F. and the products therefrom passed through line 16c and cooler 17c to separator 18c, from which the low-grade hydrogen may be introduced by lines 19c and 42 to tank 43 or may be vented through line 43'. The liquid products from each of these separators is withdrawn through lines 23a, 23b and 23c, respectively, to the fractionator, as hereinabove described. While only two hydrogen storage tanks are shown in this figure, it should be understood that three may be used if desired. Here again the low-grade hydrogen may be passed through line 41 for reconditioning freshly regenerated catalyst. Instead of increasing temperature in chambers B and C, it should be understood that decreasing space velocities or a combination of increasing temperature and decreasing space velocity may be used.

In Figure 3 I have shown two parallel conversion systems illustrated by conversion chambers E and F, respectively. In this case the hot feed stock and hot hydrogen streams are split, one portion passing through line 14e to a low temperature conversion system for making relatively low octane number gasoline and relatively pure hydrogen, and the other passing through line 14f and heater 11f (which is preferably in furnace 12) to chamber F maintained under high octane producing conditions and relatively impure hydrogen. In chamber E little or no hydrogen may be required with the feed stock since the temperature may be only about 875 to 900° F. The products from this reaction pass through line 16e, cooler 17e and separator 18e from which pure hydrogen is introduced by line 19e in compressor 20e to storage tank 22.

Under the high octane number conditions in conversion chamber F, i. e. temperatures of about 950 to 1075° F. larger concentrations in purity or hydrogen is required with the feed stock, the products from this system are passed through line 16f and cooler 17f to separator 18f; the impure hydrogen being withdrawn through line 19f, compressor 20f to tank 43. As in the previous examples, the high grade hydrogen in tank 22 is employed with the feed stock in both systems and the low grade hydrogen from tank 43 is used for regeneration and reconditioning the catalyst in both systems. The separate gasolines may be separately recovered or, as shown in the figure, they may be recovered in a single fractionating system, as hereinabove described.

Referring to Figure 4, the parallel conversion systems M and N are operated under substantially the same conditions but during the course of their operation the purity of the hydrogen gradually changes. The means for increasing the temperature of the feed stock to these respective systems is illustrated by by-pass lines 44m and 44n which include additional heating coils 11m and 11n (which may be in furnace 12). While conversion system M is operating on fresh catalyst and producing substantially pure hydrogen, the gases from separator 18m are introduced through line 45 to storage tank 22 and when it is operating on partially spent catalyst and producing low-grade hydrogen, such hydrogen is passed through line 42 to tank 43. Similarly, when system N is producing substantially pure hydrogen, it is passed through line 47 to tank 22 and when producing low-grade hydrogen it is introduced through line 48 to tank 43.

In the various figures excess hydrogen, particularly excess low grade hydrogen, can be removed from the system through any of valved vent lines 49 or through line 43' to which reference has previously been made. The vented gases can be used as fuel or otherwise.

When relatively pure hydrogen is used, it can suitably contain from 70% to 100% hydrogen by volume while the relatively impure or low grade hydrogen can suitably contain from 30% to 70% hydrogen by volume.

In all of the above examples it will be noted that we have utilized discoveries relating to the type of hydrogen produced in different stages of a dehydro-aromatization reaction or under various conditions for effecting such reaction, and relating to the effectiveness of various qualities and quantities of hydrogen in different stages of the system. While I have described in detail preferred embodiments of the invention, it should be understood that the invention applies to systems and conditions other than those hereinabove specifically set forth.

I claim:

1. The method of reforming hydrocarbons such as naphtha and heavier oils to produce aromatic motor fuel of high octane number, which method comprises vaporizing said hydrocarbons, contacting the vapors with a dehydro-aromatization catalyst at temperatures of about 850 to 1075° F. under a pressure of above 50 but below 450 pounds with a space velocity of about 0.04 volume to 10 volumes of liquid hydrocarbons per volume of catalyst space per hour to effect dehydrogenation and aromatization in a mild-condition step and a severe-condition step respectively to produce hydrogen of varying degrees of purity, separately collecting relatively pure hydrogen produced in the mild-conditions step and hydrogen of a low degree of purity produced in the severe-condition step, introducing the relatively pure hydrogen together with the hydrocarbon vapors into contact with the catalyst when the catalyst is partially spent and discharging at least a part of the relatively impure hydrogen from the system.

2. The method of claim 1 which includes the steps of regenerating said catalyst when it becomes insufficiently effective for effecting the desired aromatization of aliphatic hydrocarbons and conditioning the regenerated catalyst with at least a part of the relatively impure hydrogen.

3. The method of claim 1 which includes the further step of purifying at least a part of the impure hydrogen and combining the purified hydrogen with the relatively pure hydrogen produced in the system.

4. The method of producing an aromatic high octane number motor fuel from relatively low octane number, normally liquid and chiefly aliphatic hydrocarbons such as naphtha and heavier oils which comprises heating a part of said hydrocarbons to a temperature of above 850 but below 925° F. and contacting said heated hydrocarbons with a dehydro-aromatization catalyst of a space velocity of about 0.04 volume to 2 volumes of liquid hydrocarbons per volume of catalyst space per hour, whereby a relatively pure hydrogen is produced, separating said relatively pure hydrogen from the remaining reaction products and introducing it into a hydrogen storage zone, heating another part of said hydrocarbons to a temperature of above 925 but below 1075° F. and contacting said heated hydrocarbons with said dehydro-aromatization catalyst in the presence of added hydrogen at a pressure of about 50 to 450 pounds per square inch and with a space velocity of about 0.04 to 10 volumes of liquid hydrocarbons per volume of catalyst space per hour, whereby relatively impure hydrogen is produced along with hydrocarbon gases, separating said impure hydrogen and gases from other reaction products and venting at least a part of said impure hydrogen from the system, fractionating the remaining products from both conversion steps for the recovery of high quality motor fuel therefrom, and introducing hydrogen from the storage zone into that part of the hydrocarbons which is treated in the second-named conversion step.

5. The method of claim 4 which includes the step of introducing hydrogen from said storage zone into said first-named conversion step.

6. The method of claim 4 wherein the first conversion step is effected on relatively fresh catalyst and the second conversion step is effected on said catalyst after it has become partially spent.

7. The method of claim 4 wherein a portion of the impure hydrogen is introduced into a part of the hydrocarbons in admixture with hydrogen from said first storage zone.

8. The method of operating a dehydro-aromatization system for converting low octane number and chiefly aliphatic naphthas into high octane number motor fuels which comprises dehydro-aromatizing said naphthas under relatively mild and relatively severe conditions whereby substantially pure hydrogen is produced under relatively mild conditions and low grade hydrogen is produced under the severe conditions with the same catalyst, segregating the hydrogen produced under mild conditions from the hydrogen produced under severe conditions, and utilizing the hydrogen produced under said mild conditions in the conversion step employing the relatively severe conditions.

9. The method of claim 8 which includes the further steps of purifying at least a part of the low grade hydrogen and combining the purified part with the relatively pure hydrogen.

10. The method of claim 8 which includes the further step of reconditioning catalyst material by contacting it at elevated temperatures with a part of the low grade hydrogen.

11. The method of converting low knock rating naphthas into high knock rating motor fuel in a multi-stage, continuous catalytic conversion system which comprises passing a dehydro-aromatizing catalyst consecutively through a plurality of zones including a first zone containing fresh catalyst and a last zone containing a partially spent catalyst, passing a part of the naphtha through said first zone at a temperature of about 875 to 925° F. with a space velocity low enough to effect dehydrogenation and at least partial aromatization, separating the hydrogen from the liquid conversion products, heating another part of said naphtha to a higher temperature within the range from about 900 to 1075° F., introducing hydrogen produced from said first zone into said other part of the naphtha and passing the mixture of hydrogen and naphtha through the last zone at a higher temperature than that prevailing in the first zone.

12. The method of claim 11 which includes the step of heating said portion of the hydrogen introduced into said last zone to a temperature of above 950 to 1075° F. prior to its admixture with the naphtha charged to said last zone.

13. The method of prolonging the catalyst life in a dehydro-aromatization conversion system for the production of high quality motor fuel from low octane number hydrocarbons of from 6 to 14 carbon atoms which comprises contacting said catalyst with hydrocarbon vapors at temperatures of about 875 to 1075° F. and at a pressure of about 30 to 450 pounds per square inch, and with space velocities sufficiently low to effect substantial amounts of aromatization of aliphatic hydrocarbons, separating a hydrogen containing gas from the products of conversion, recycling a part of said gas to said contacting step while maintaining a hydrogen concentration in said recycled gas of at least 50% throughout the entire conversion step, and gradually increasing the amount of recycled gas after the catalyst becomes more and more spent.

14. The method of prolonging the catalyst life in a dehydro-aromatization conversion system for the production of high quality motor fuel from low octane number hydrocarbons of from 6 to 14 carbon atoms which comprises contacting said catalyst with hydrocarbon vapors at temperatures of about 875 to 1075° F. and at a pressure of about 30 to 450 pounds per square inch, and with space velocities sufficiently low to effect substantial amounts of aromatization of aliphatic hydrocarbons, separating a hydrogen containing gas from the products of conversion, recycling a part of said gas to said contacting step while maintaining a hydrogen concentration in said recycled gas of at least 50% throughout the entire conversion step, and increasing the hydrogen content of the recycled gas after the catalyst becomes more and more spent.

15. The method of dehydro-aromatizing aliphatic hydrocarbons of the naphtha boiling range which comprises vaporizing a charging stock rich in aliphatic hydrocarbons of the naphtha boiling range, contacting the vaporized hydrocarbons with a dehydro-aromatization catalyst at a temperature within the approximate range of 850 to 1075° F. under a pressure within the approximate range of 50 to 450 pounds per square inch at a space velocity within the approximate range of 0.2 to 2 volumes of liquid charging stock feed per hour per volume of catalyst space for effecting dehydrogenation and aromatization of a substantial amount of the aliphatic hydrocarbons in said charging stock, segregating the relatively pure hydrogen produced at one stage of the contacting step from a relatively impure hydrogen produced in another stage of said contacting step, separately storing said relatively pure hydrogen and said relatively impure hydrogen respectively in separate hydrogen accumulation zones, passing relatively pure hydrogen from the relatively pure hydrogen accumulation zone through the contacting zone while said zone is on-stream and passing relatively impure hydrogen from the impure hydrogen accumulation zone through said contacting zone in the absence of charging stock vapors at a time when said contacting zone is not on-stream.

WILLIAM B. PLUMMER.